Nov. 26, 1935.  G. L. DIMMICK  2,022,495
SOUND RECORDING APPARATUS
Filed Dec. 9, 1932   2 Sheets-Sheet 1

INVENTOR
G. L. DIMMICK
BY
ATTORNEY

Nov. 26, 1935.  G. L. DIMMICK  2,022,495
SOUND RECORDING APPARATUS
Filed Dec. 9, 1932  2 Sheets-Sheet 2

INVENTOR
G. L. DIMMICK
BY H. S. Grover
ATTORNEY

Patented Nov. 26, 1935

2,022,495

UNITED STATES PATENT OFFICE 2,022,495

SOUND RECORDING APPARATUS

Glenn L. Dimmick, Westmont, N. J., assignor to Radio Corporation of America, a corporation of Delaware Application December 9, 1932, Serial No. 646,390

5 Claims. (Cl. 179—100.3)

This invention relates to sound recording apparatus and more particularly to the variety thereof wherein a variable beam of light is applied to a soundtrack of a photographic film.

In the particular apparatus here involved, a diaphragm is used to directly actuate a reflecting member through an improved mechanical amplifying system which serves to amplify the slight movement of the diaphragm so as to produce a relatively large angular movement of the reflecting member, and thereby produce a soundtrack of appreciable magnitude.

One object of the invention is to provide such an apparatus having a very great angular rotation of the mirror on a slight movement of the diaphragm.

Another object of the invention is to provide such a device including a mechanical filtering system for preventing the reproduction of certain frequencies or for exaggerating the reproduction of other frequencies, or both.

Another object of the invention is to provide such a device which is extremely rugged and unlikely to get out of order.

Another object of the invention is to provide such a device which is simple and inexpensive to construct accurately.

Figure 1:
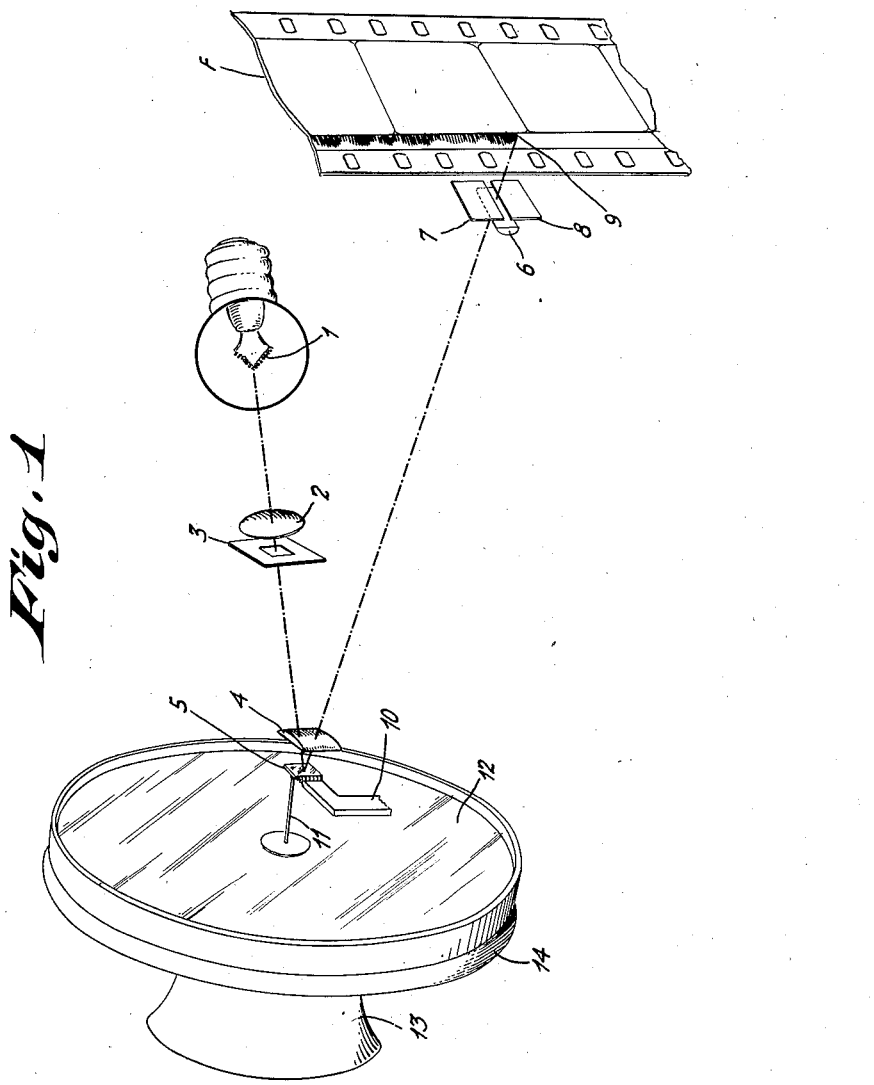
Fig. 1 shows a typical arrangement of the apparatus.

As shown in Fig. 1, light from a source 1 is condensed by the lens 2 through the rectangular aperture 3 and the cylindrical lens 4 upon the movable mirror 5. After reflection from the mirror 5, the light again traverses the lens 4 and passes to the lens 6.

The margins of each are appropriately limited by the masks 7 and 8, and the lens 6 forms upon the film F at the point 9 a vertically reduced image of the rectangular aperture 3.

It will be noted that since the lens 6 is cylindrical, it images only the upper and lower margins of the said rectangular aperture, and the width of the image bears the same ratio to the width of the aperture as the distance from the lens 6 to the point 9 bears to the distance from the lens 6 to the mirror 5 and thence to the aperture member 3.

The cylindrical lens 4 is of such focal length that it forms an image of the vertical sides of the aperture in the member 3 at the point 9, and thereby sharply defines the images of the ends of the line of light.

In the form of the device shown in this figure, the mirror 5 is hinged to the arm 10 and is oscillated about the hinge by the driving rod 11 which is attached at one end to the diaphragm 12 and the other end of which is attached to the mirror close to the hinge.

The apparatus is, of course, provided with the usual mouthpiece 13 and sound-box 14.

Figure 2:
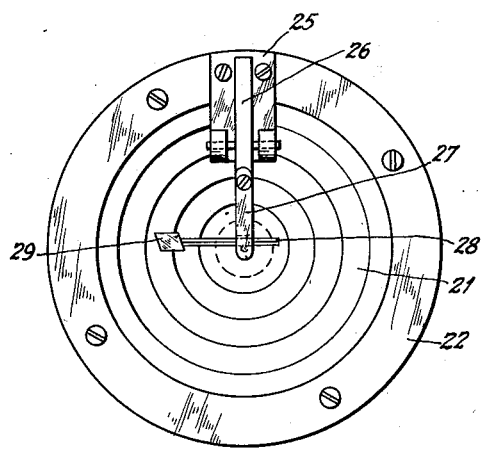
Fig. 2 shows a rear view of the diaphragm and attendant mechanism in a commercial form of the device.
Figure 3:
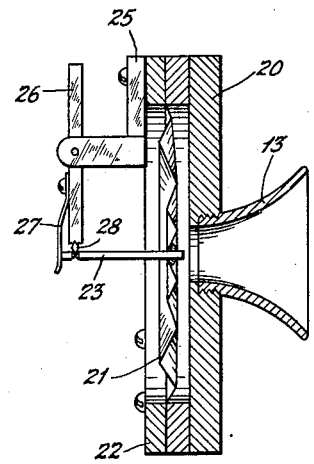
Fig. 3 is a vertical sectional view along the median line of Fig. 2.
Figure 4:
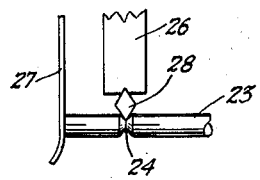
Fig. 4 is a detail of the mounting of the mirror support.

In the form of the device shown in Figs. 2, 3 and 4, a modified form of mirror hinge and support therefor is provided which is particularly effective for use in talking motion picture camera where a light, compact and dependable construction is necessary. As shown in Figs. 2 and 3, a mouthpiece 13 is provided which is fitted into the sound-box cover 20. The corrugated diaphragm 21 is held on the sound-box by the retaining ring 22 which is secured thereagainst in any appropriate manner such, for example, as the screws illustrated.

The diaphragm 21 carries a spindle 23 which extends perpendicularly from the rear thereof and which, as shown in Fig. 4, is provided with a circular groove 24. A bracket 25 is supported upon the ring 22 and carries pivotally mounted thereon the arm 26. The arm 26 is maintained in proper relation with the spindle 23 by the spring 27 and between a small notch in the end of the arm 26 and the circular grove 24 in the spindle 23 is located a diamond shaped supporting member 28, which in turn carries the mirror 29 of Fig. 2. The end of the rod 23 is securely fastened to the spring 27 by soldering or brazing, or it may be screwed or riveted to the spring in order to maintain these two parts rigidly in proper relation.

Since the diamond-shaped member 28 is of very small cross-section, it will be apparent that a very slight relative movement of the spindle 23 and the arm 26 will cause considerable angular rotation thereof, and a correspondingly great angular deflection of the mirror 29.

Since the arm 26 is pivoted to the bracket 25 and is free to move about that pivot, and the end of the arm 26 is maintained in proper relation of the spindle 23 by the spring 27, it will be apparent that any pressure applied slightly to the diaphragm 21 will cause movement of the arm 26 about its pivot but no movement of the mirror 29. The mass of the arm 26, the stiffness of the spring 27 and the stiffness of the diaphragm are, however, so chosen that within the band of frequencies which it is desired to record, the inertia of the bar 26 will prevent its movement, and the mirror 29 will be actuated while at lower frequencies the bar 26 will merely move about its pivot. By making the bar 26 sufficiently light or sufficiently heavy, the point of cut-off of the lower frequencies can be determined quite exactly.

It will be apparent that other types of vibration-converting means than the mirror 29 may be used if the construction is applied to other forms of apparatus, and the vibration-translating rod 28 may be of any cross-section functionally equivalent to the diamond shape shown, although the diamond shape is apparently the most convenient form providing two opposite knife-edges for engagement with the other members.

The efficiency of this system can be still further increased by bringing the natural "whip" frequency of the pivoted bar within the useful range. This requires that the bar be limber enough so that its first mode of vibration occurs at a slightly higher frequency than the highest frequency to which the entire system readily responds.

Having thus described my invention, I claim:

1. Photophonographic apparatus comprising a member vibratable in response to a predetermined band of frequencies, a second member resistant to vibration in a portion only of said band, and a vibration-translating means pivotally connected to both of said members, whereby said means responds only to differential movement between said members.

2. Photophonographic apparatus comprising a driving rod vibratable in response to a predetermined band of frequencies, a pivot bar vibratable in response to a portion only of said band, and vibration-translating means pivoted to both of said members, whereby said means responds only to differential movements between said driving rod and said pivot bar.

3. Photophonographic apparatus comprising a driving rod vibratable in response to a predetermined band of frequencies, a pivot bar resistant to vibration in a portion only of said band, and a vibration-translating means pivotally connected to both of said members, whereby said means responds only to differential movements between said driving rod and said pivot bar.

4. Photophonographic apparatus comprising a driving rod vibratable in response to a predetermined band of frequencies, a pivot bar resistant to vibration in a portion only of said band, and a rotatable mirror spindle pivotally connected to both of said members whereby said mirror spindle responds only to differential movement between said driving rod and said pivot bar.

5. Photophonographic apparatus comprising a driving rod vibratable in response to a predetermined band of frequencies, a pivot bar resistant to vibration in a portion only of said band, a rotatable mirror spindle pivotally connected to both of said members whereby said mirror spindle responds only to differential movement between said driving rod and said pivot bar, and a mirror fixed to said spindle and rotatable therewith.

GLENN L. DIMMICK.